United States Patent

[11] 3,567,973

| [72] | Inventors | Alfred Mastrodonato, Sr.;<br>Kurt Porter, Owosso; Robert R. Rhoads,<br>Corunna, Mich. |
|---|---|---|
| [21] | Appl. No. | 740,338 |
| [22] | Filed | June 26, 1968 |
| [45] | Patented | Mar. 2, 1971 |
| [73] | Assignee | Universal Electric Company<br>Owosso, Mich. |

[54] ELECTRIC MOTORS
24 Claims, 20 Drawing Figs.

[52] U.S. Cl. .................................................. 310/42,
310/89, 310/258
[51] Int. Cl. ...................................................... H02k 5/04,
H02k 15/14
[50] Field of Search .......................................... 29/596;
310/(MM), 42, 85, 89, 90, 216, 217, 254, 258—9

[56] References Cited
UNITED STATES PATENTS

| 2,701,318 | 2/1955 | Feiertag | 310/258 |
| 2,944,169 | 7/1960 | Schmidt | 310/83 |
| 3,321,654 | 5/1967 | Allendorph | 310/258 |

*Primary Examiner*—W. E. Ray
*Attorney*—Barnes, Kisselle, Raisch and Choate

ABSTRACT: In one form the electric motor comprises an improved frame which rotatably supports the rotor shaft. This frame consists of a circular shell which encircles the stator and two end members which engage into the inside of the shell and contain a bearing for supporting an end of the shaft. The shell has a plurality of notches at each end for receiving mating projections on the end member, thus securing the end member against relative rotational movement. The shell also has a plurality of slots in each end which serve to define a portion of the shell which can be deformed radially inward after assembly of the end members to secure the end members against axial movement.

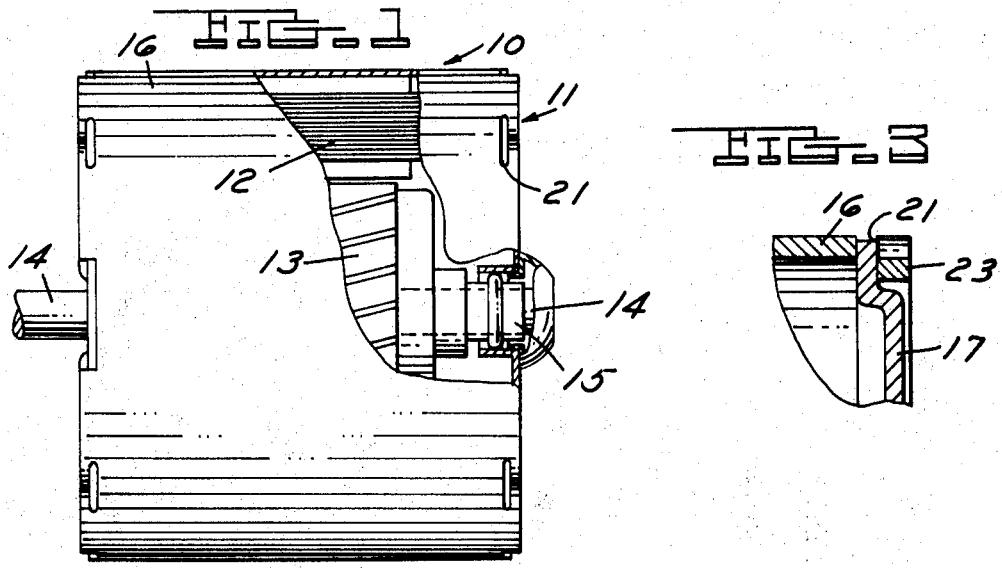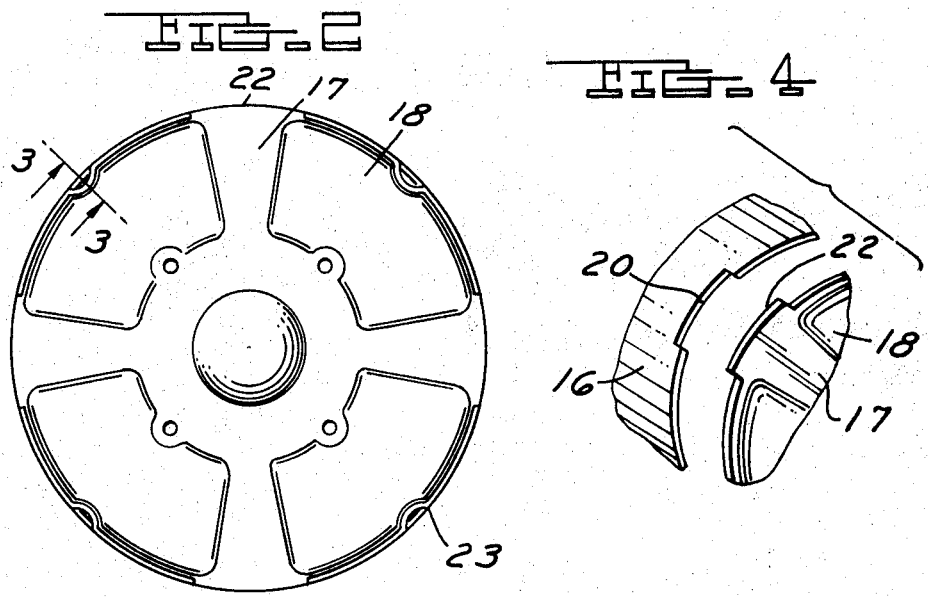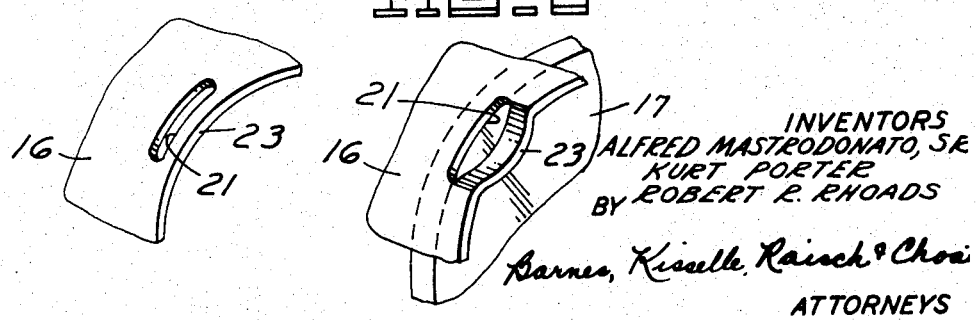
INVENTORS
ALFRED MASTRODONATO, SR.
KURT PORTER
BY ROBERT R. RHOADS
Barnes, Kisselle, Raisch & Choate
ATTORNEYS

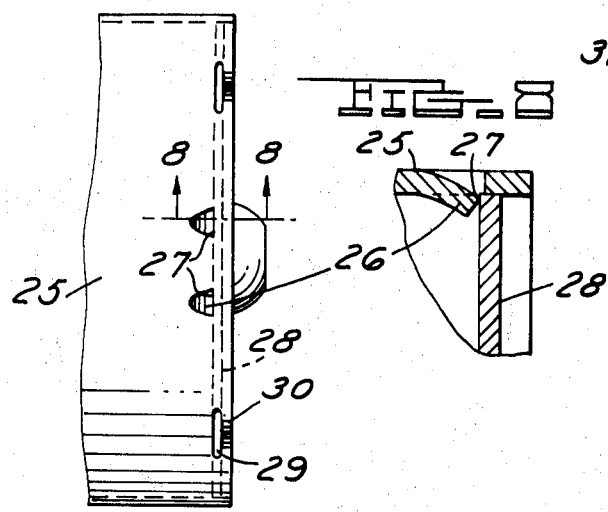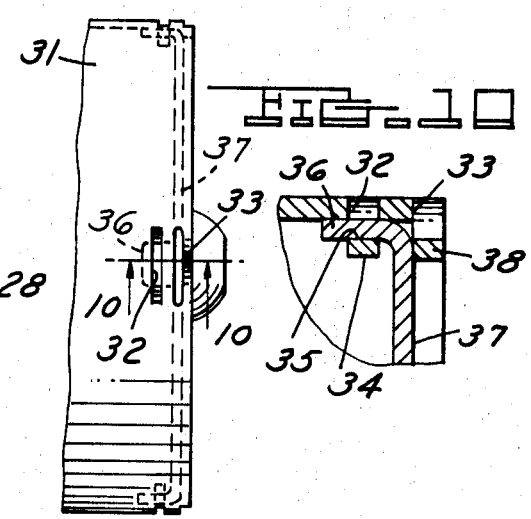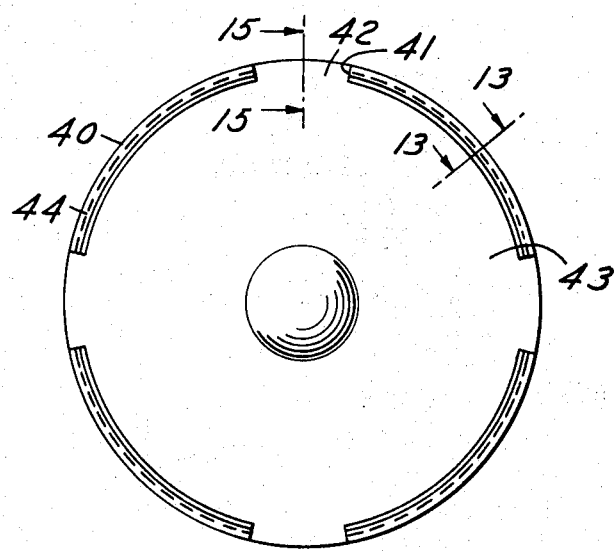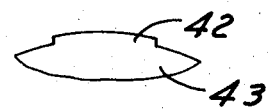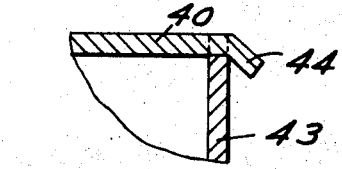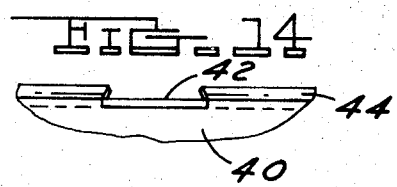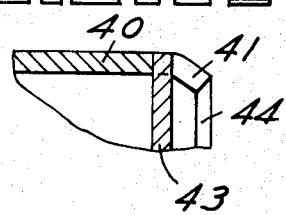

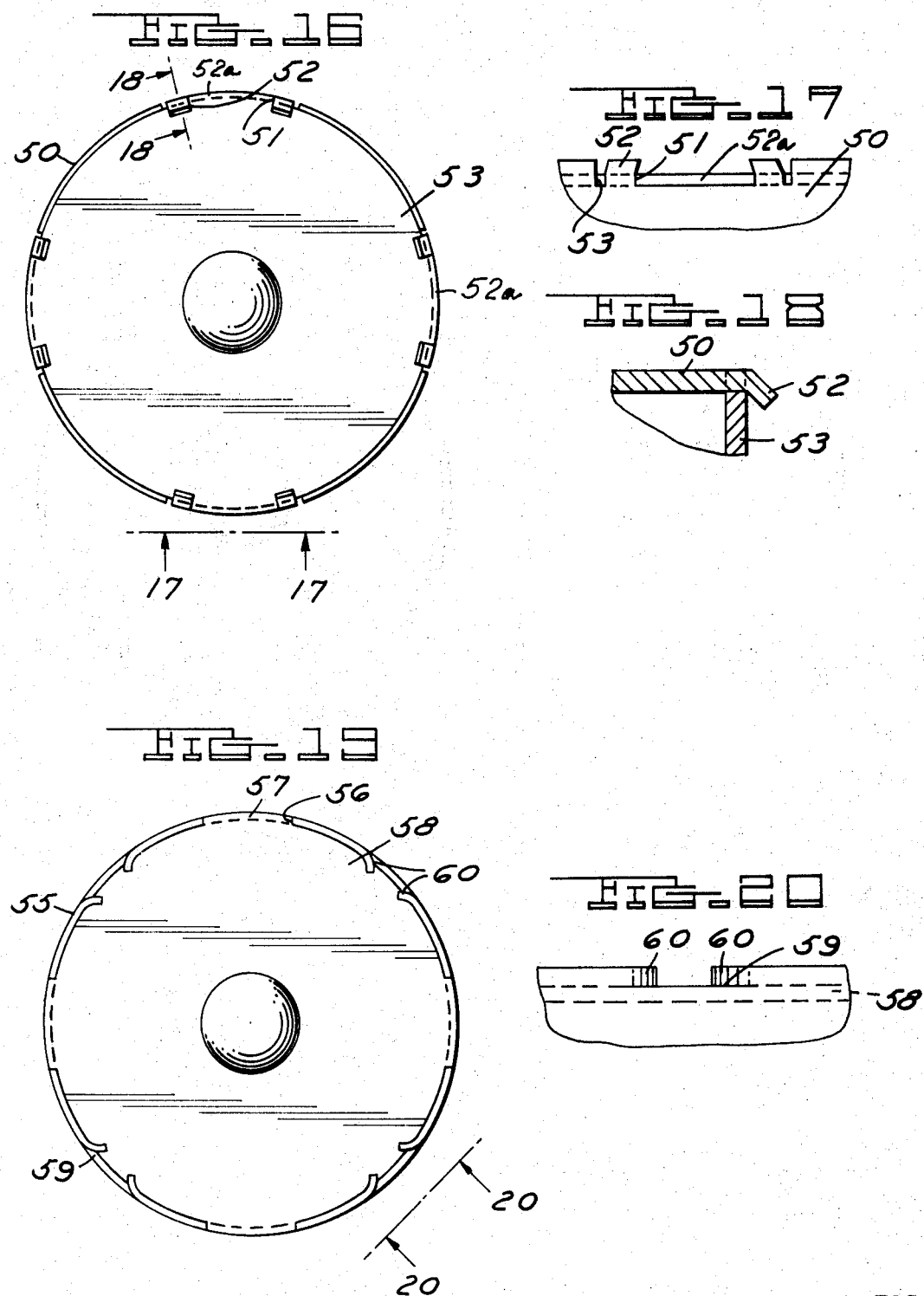

3,567,973

ELECTRIC MOTORS

This invention relates to electric motors and more particularly to the construction of the frame or housing of an electric motor.

In the construction of electric motors it is customary to provide a cylindrical steel shell which encloses the stator and also to provide substantially flat circular end members or closures which support the bearings of the motor and hold them in concentric relationship to the stator. It is customary to provide such end members with a precision machined male rabbet which nests into a female rabbet machined into the cylindrical shell, thus providing the necessary precision location of the bearing. Close tolerance is necessary to center the rotor into stator and to hold the end closures perpendicular to the shell. The end members are held in position on the shell by bolts which extend through both end members and the full length of the cylindrical shell.

The cylindrical shells are made by rolling a flat piece of sheet metal and welding the resulting seam together. Because of the nature of the process, it is impossible to assure that the ends of the cylinder so formed will be perpendicular to the cylindrical axis. In fact, the sheet metal may deviate as much as one sixty-fourth of an inch from a single plane thus forming a mismatch at the circumferential meeting of the ends of the sheet metal. This resulting mismatch and nonperpendicularity can only be corrected by a costly machining operation.

There are several disadvantages to using bolts to hold the end members in place. First, because motors vary in length and because it is necessary to offer a large variety of bolt lengths for the motor for mounting purposes, an extremely large inventory of bolts must be maintained. Second, a hole must be provided in the stator for the bolt to pass through the stator. This creates an area of high reluctance to the passage of magnetic flux. This hole is also very difficult to keep free of integral insulation and varnish. Third, the bolt must be adequately insulated from the motor winding. This is done by either insulating the bolt, the winding, or by forming the winding such that there is an adequate airgap clearance to the bolt.

Among the objects of the invention are to provide a low cost accurate means of locating and aligning the end members of an electrical motor and to secure such members to the shell of the motor in a novel manner; to provide securing means such that the process can be reversed to provide for disassembly of the motor for repairs; to have the end members secured such that there can be no relative movement to the motor shell; to provide a securing means for the end members which does not require holes, slots, or notches in the stator and does not require special forming or insulating of either the winding or the securing means; to provide a securing means for the end members which will not require openings through either the end member or the shell which will remain open after the motor is assembled; to provide registering surfaces on the end members and shell which are not subject to distortion under impact loads.

In the drawings:

FIG. 1 is a part sectional, side elevational view of an electric motor embodying the invention;

FIG. 2 is an end view of the same;

FIG. 3 is a fragmentary sectional view on an enlarged scale taken along the lines 3-3 in FIG. 2;

FIG. 4 is a fragmentary exploded perspective view of a portion of an electric motor shown in FIGS. 1-3;

FIG. 5 is a fragmentary perspective view of another portion of the electric motor prior to assembly;

FIG. 6 is a fragmentary perspective view showing a portion of the motor after assembly;

FIG. 7 is a fragmentary side elevational view of a modified form of an electric motor;

FIG. 8 is a fragmentary sectional view on an enlarged scale taken along the line 8-8 in FIG. 7;

FIG. 9 is a fragmentary side elevational view of a further modified form of electric motor;

FIG. 10 is a fragmentary sectional view on an enlarged scale taken along the line 10-10 in FIG. 9;

FIG. 11 is an end view of a further modified form of electric motor;

FIG. 12 is a fragmentary plan view of a portion of the motor shown in FIG. 11;

FIG. 13 is a fragmentary sectional view on an enlarged scale taken along the line 13-13 in FIG. 11;

FIG. 14 is a fragmentary view taken along the line 14-14 in FIG. 11;

FIG. 15 is a fragmentary sectional view on an enlarged scale taken along the line 15-15 in FIG. 11;

FIG. 16 is an end view of a further modified form of the the invention;

FIG. 17 is a fragmentary view on an enlarged scale taken along the line 17-17 in FIG. 16;

FIG. 18 is a fragmentary sectional view on an enlarged scale taken along the line 18-18 in FIG. 16;

FIG. 19 is an end view of a further modified form of the invention; and

FIG. 20 is a fragmentary view on an enlarged scale taken along the line 20-20 in FIG. 19.

Referring to FIG. 1, electric motor 10 embodying the invention comprises a frame 11 in which a stator 12 is fixed and a rotor 13 on a shaft 14 which is rotatably supported by bearings 15. The frame 11 comprises a cylindrical shell 16 and end members 17 which support the bearings 15.

The shell 16 is made from sheet metal that is formed into a cylinder from a rectangular blank and welded longitudinally at the abutting or overlapping edges of the blank.

After forming, the shell 16 is placed on an arbor to shape the shell so that its interior surface is accurately formed cylindrically to receive the stator 12. Each end member 17 is also made of sheet metal and may have embossed portions 18.

After the shell 16 is formed, circumferentially spaced notches 20 (FIG. 4) and slots 21 (FIG. 5) are accurately pierced in the shell in a single punching operation for each end or both ends at once so that the distances between the base of the notches 20 at opposite ends and the distance between the slots 21 at opposite ends are accurate longitudinally of the shell.

Each end member 17 is formed with radially outwardly extending portions 22 that engage the radial surfaces of the base of notches 20.

Since the base of each notch 20 is accurately positioned longitudinally of the shell, the end member is in turn located accurately axially with respect to the shell. The engagement of the portions 22 with the sides of the notch 20 prevents circumferential movement of the end member.

The segments 23 defined by the slots 21 are then bent intermediate their ends as at FIGS. 2, 3 and 6 radially inwardly against the outer surface of the end member 17 to hold end members in position without the use of bolts, screws or other types of fasteners.

Since the end members 17 are accurately positioned circumferentially and axially with respect to the shells, the bearings supported thereby will also be accurately positioned so that the longitudinal axis of the rotor 13 may coincide with the longitudinal axis of the shell 16.

In the form of the invention shown in FIGS. 7 and 8, each end of cylindrical shell 25 has circumferentially spaced struck out portions 26 extending radially inwardly to define accurately positioned edges or radial surfaces 27 against which the end members 28 abut. The distance between portions 26 longitudinally is accurately defined. The periphery of each end member 28 is circular and the shell 25 is formed with circumferentially spaced slots 29, which are accurately located axially relative to one another as are the notches 21 in the previous form of the invention. This defines segments 30 that are bent radially inwardly and down against the outer surface of the end members 28 to hold the end members in position in the manner of the previous form of the invention.

In the form of the invention shown in FIGS. 9 and 10, shell 31 is formed with pairs of slots 32, 33, accurately positioned longitudinally relative to one another. In assembly the slots 32 define segments 34 that are bent radially inwardly to form radial surfaces against which end members 37 abut and openings 35 for receiving axial projections 36 on the end members 37 to thereby locate the end members 37 circumferentially. The slots 33 define segments 38 that are bent radially inwardly against the outer surface of the end members 37 to hold the end member 37 in position as in the previous forms of the invention.

In the form of the invention shown in FIGS. 11—15, the cylindrical shell 40 is formed with circumferentially spaced notches 41 defining radial surfaces for receiving radial projecting portions 42 of the end members 43 in a manner similar to the form of the invention shown in FIGS. 1—6. However, in this form of the invention, the portions 44 of the shell intermediate the notches 41 are bent radially inwardly over the edges of the end members 43 to hold the end members 43 in position (FIGS. 11, 13, and 15).

In the form of the invention shown in FIGS. 16—18, the cylindrical shell 50 is formed with notches 51 defining radial surfaces into which radially extending portions 52a of the end members 53 extend as in the forms of the invention shown in FIGS. 1—6 and 11—15. However, in this form, the portions 52 of the end of the shell adjacent the sides of the notches 51 are separated by slots 53 from the remainder of the periphery and bent inwardly (FIG. 18) against the outer surface of the end members 53.

In the form of the invention shown in FIGS. 19 and 20, cylindrical shell 55 has circumferentially spaced notches 56 defining radial surfaces against which radial portions 57 of the end member 58 abut as in the forms of the invention shown in FIGS. 1—6, 11—15 and 16—18. Other portions of the periphery of the shell 55 have circumferentially spaced slits 59 which define separated oppositely directed segments 60 that are bent inwardly against the outer surface of the end member 58.

In each of the forms of the invention, the end members are located axially by surfaces formed in the shell which surfaces are spaced from the outer edges of the shell that may not be accurate after the forming operation. In this manner, any inaccuracy of the outer edges is avoided in the location of the end members.

We claim:

1. In an electric motor, the combination comprising:
a motor frame for rotatably supporting a rotor shaft;
said frame comprising a generally cylindrical shell adapted to encircle the stator of the motor;
and a pair of end members;
one of said shell and the associated end member having radially extending circumferentially spaced portions defining radial abutting surfaces;
said surfaces on said shell being accurately positioned longitudinally of said shell relative to one another and relative to the axis of said shell;
the other of said shell and said end members having surfaces engaging said last-mentioned surfaces;
said shell having circumferentially spaced portions thereof bent radially inwardly to engage the outer surface of said end members and thereby retain said end members against axial movement relative to said shell; and
said last-mentioned portions being defined by circumferentially spaced and circumferentially extending slots in said shell.

2. In an electric motor, the combination comprising:
a motor frame for rotatably supporting a rotor shaft;
said frame comprising a generally cylindrical shell adapted to encircle the stator of the motor;
and a pair of end members;
one of said shell and the associated end member having radially extending circumferentially spaced portions defining radial abutting surfaces;
said surfaces on said shell being accurately positioned longitudinally of said shell relative to one another and relative to the axis of said shell;
the other of said shell and said end members having surfaces engaging said last-mentioned surfaces;
said shell having circumferentially spaced portions thereof bent radially inwardly to engage the outer surface of said end members and thereby retain said end members against axial movement relative to said shell;
said first-mentioned radially extending portions on said one of said shell and said end members comprising notches circumferentially spaced on the ends of said shell;
the bases of said notches defining said accurately formed radial surfaces; and
said end member having radially extending projections with surfaces abutting said radially extending surfaces.

3. The combination set forth in claim 2 wherein circumferentially spaced portions of said shell are defined by a slot spaced from the ends of said shell;
said portions being bent inwardly intermediate the ends thereof against the outer surface of the end member.

4. In an electric motor, the combination comprising:
a motor frame for rotatable rotatably supporting a rotor shaft;
said frame comprising a generally cylindrical shell adapted to encircle the stator of the motor;
and a pair of end members;
one of said shell and the associated end member having radially extending circumferentially spaced portions defining radial abutting surfaces;
said surfaces on said shell being accurately positioned longitudinally of said shell relative to one another and relative to the axis of said shell;
the other of said shell and said end members having surfaces engaging said last-mentioned surfaces;
said shell having circumferentially spaced portions thereof bent radially inwardly to engage the outer surface of said end members and thereby retain said end members against axial movement relative to said shell; and
said first-mentioned radially extending portions on one of said shell and said end member comprising portions of said shell spaced from the ends thereof and bent inwardly to define said radially extending surfaces.

5. The combination set forth in claim 4 wherein said radially extending portions comprise circumferentially spaced edge portions of said shell defined by circumferentially spaced slots in said shell which are bent intermediate the ends thereof, radially inwardly against the outer surface of the end member.

6. In an electric motor, the combination comprising:
a motor frame for rotatably supporting a rotor shaft;
said frame comprising a generally cylindrical shell adapted to encircle the stator of the motor;
and a pair of end members;
one of said shell and the associated end member having radially extending circumferentially spaced portions defining radial abutting surfaces;
said surfaces on said shell being accurately positioned longitudinally of said shell relative to one another and relative to the axis of said shell;
the other of said shell and said end members having surfaces engaging said last-mentioned surfaces;
said shell having circumferentially spaced portions thereof bent radially inwardly to engage the outer surface of said end members and thereby retain said end members against axial movement relative to a said shell;
said first-mentioned portions comprising circumferentially spaced segments defined by circumferentially extending slits; and
said segments being bent inwardly intermediate their ends against which the end member abut.

7. The combination set forth in claim 6 wherein each said end member has axially extending projections extending into the space between said last-mentioned segments and the interior surface of said shell.

8. The combination set forth in claim 7 wherein said radially inwardly bent portions are on said shell and comprise circumferentially spaced segments defined by slots in the periphery of the shell which segments are bent intermediate their ends against the outer surfaces of the end member.

9. In an electric motor, the combination comprising:
a motor frame for rotatably supporting a rotor shaft;
said frame comprising a generally cylindrical shell adapted to encircle the stator of the motor;
and a pair of end members;
one of said shell and the associated end member having radially extending circumferentially spaced portions defining radial abutting surfaces;
said surfaces on said shell being accurately positioned longitudinally of said shell relative to one another and relative to the axis of said shell;
the other of said shell and said end members having surfaces engaging said last-mentioned surfaces;
said shell having circumferentially spaced portions thereof bent radially inwardly to engage the outer surface of said end members and thereby retain said end members against axial movement relative to said shell;
said radially extending surfaces being defined by circumferentially spaced notches in the periphery of the shell; and
the radially inwardly bent portions of said shell extending circumferentially between said notches and comprising said portions bent radially inwardly against the outer surface of the end member.

10. The combination set forth in claim 9 wherein said radially inwardly bent portions comprise circumferentially spaced tabs engaging the sides of said radially extending portions and the periphery of the end member.

11. The combination set forth in claim 9 wherein said radially inwardly extending portions comprise spaced pairs of tabs bent inwardly from the periphery of the shell.

12. In an electric motor, the combination comprising:
a motor frame for rotatably supporting a rotor shaft;
said frame comprising a generally cylindrical shell encircling the stator of the motor;
and a pair of end members;
the ends of said shell having circumferentially spaced notches therein defining radial abutting surfaces;
said notches being accurately positioned longitudinally of said shell relative to one another and relative to the axis of said shell;
said end members having radially extending portions engaging said last-mentioned surfaces; and
said shell having circumferentially spaced portions thereof bent radially inwardly to engage the outer surface of said end members and thereby retain said end members against axial movement relative to said shell.

13. The combination set forth in claim 7 wherein said last-mentioned portions are defined by circumferentially spaced and circumferentially extending slots.

14. The combination set forth in claim 7 wherein said last-mentioned portions of said shell comprise circumferentially spaced portions bent radially inwardly against the outer surface of said end members.

15. The combination set forth in claim 7 wherein said last-mentioned portions comprise circumferentially spaced tabs engaging the outer surface of said end member.

16. The combination set forth in claim 7 wherein said last-mentioned portions comprise isolated longitudinally slit tabs bent radially inwardly against the outer end of said end members.

17. In a dynamoelectric machine, a cylindrical outer housing, axial notches at the ends of said housing, circumferential slots in said housing adjacent to and spaced from the ends of said housing, a pair of end frames, radially extending tabs on said frames received in said housing notches, the portions of said housing between the slots and the housing ends being deformed radially inwardly to bear against the outer end frame portion between said tabs to prevent axial movement of said end frames.

18. In a dynamoelectric machine;
an end frame;
means on said end frame defining surfaces which extend in a generally radial direction and face generally in both axial directions relative to the axis of said dynamoelectric machine;
an outer housing shell including first and second sets of radial surfaces engaging said end frame in at a plurality of areas around the end frame, said first set of radial surfaces engaging the radial end frame surfaces which face in one axial direction and the second set of radial surfaces engaging the radial end frame surfaces which face in the opposite axial direction to thereby hold the end frame against axial movement;
means defining a plurality of openings in said shell spaced inwardly of an axial end of said shell and relatively spaced around said shell; and
and the radial surfaces of said first set comprising deformed portions at said openings.

19. The dynamoelectric man machine of claim 18 wherein said radial end frame surfaces face axially inward and axially outward and said first set of radial surfaces engage said outwardly facing end frame surface.

20. The dynamoelectric machine of claim 18 wherein said shell includes an axial end edge; and wherein said end frame includes a plurality of generally radial tabs angularly spaced on said end frame and providing the radial end frame surfaces extending in one direction, said radial tabs engaging said end edge.

21. The dynamoelectric machine of claim 20 including means defining indentations in and spaced around said end edge, said indentations providing said second set of radial surfaces; and said tabs having a spacing on said end frame corresponding to the relative spacing between the indentations on said end edge and engaged in respective ones of said indentations.

22. The dynamoelectric machine of claim 21 wherein said end frame includes means defining surfaces offset axially inward with respect to said tabs and providing the end frame surfaces extending in the axial direction opposite to said radial tab surfaces;
said axially offset portions disposed within said shell and said tabs having a radial projection beyond said offset portions; and
wherein said deformed portions engage the axially outer surface of said offset portions.

23. The dynamoelectric machine of claim 18 wherein said openings are in the form of generally arcuate slots; and wherein said deformed portions are located axially between said slots and said end edge.

24. The dynamoelectric machine of claim 18 wherein said shell is generally cylindrical having an end edge and inner surface;
including means defining notches in and relatively spaced around said end edge, said notches providing said second set of radial surfaces;
wherein said end frame includes a plurality of tabs projecting radially inward from said end frame and relatively spaced apart on said end frame at said end frame end edge in accordance with the spacing of said notches on said shell end edge and engaged in said notches, said notches holding said end frame against axial movement in one direction and rotation relative to said shell;
said end frame including portions between said tabs disposed within said shell engaging said inner surface; and
wherein said deformed portions engage the axially outward facing surface of said portions between said tabs.

PO-1050
(5/69)

UNITED STATES PATENT OFFICE
CERTIFICATE OF CORRECTION

Patent No. __3,567,973__  Dated __March 2, 1971__

Inventor(s) __Alfred Mastrodonato, Sr., Kurt Porter and Robert R. Rhoads__

It is certified that error appears in the above-identified patent and that said Letters Patent are hereby corrected as shown below:

Column 4, line 20, before "rotatably" cancel --rotatable--

Column 5, between lines 22 and 23, insert --said end member having radially extending portions engaging the base of said notches,--

Column 6, line 10, after "frame" cancel --in--

Column 6, line 22, before "machine" cancel --man--

Signed and sealed this 10th day of August 1971.

(SEAL)
Attest:

EDWARD M. FLETCHER, JR.
Attesting Officer

WILLIAM E. SCHUYLER, JR.
Commissioner of Patents

UNITED STATES PATENT AND TRADEMARK OFFICE
CERTIFICATE OF CORRECTION

PATENT NO. : 3,567,973

DATED : March 2, 1971

INVENTOR(S) : Alfred Mastrodonato, Sr. et al

It is certified that error appears in the above-identified patent and that said Letters Patent are hereby corrected as shown below:

Column 5, line 50, cancel '7' and insert --12-- line 53, cancel '7' and insert --12-- line 57, cancel '7' and insert --12-- line 60, cancel '7' and insert --12--

Signed and Sealed this

Twenty-third Day of May 1978

[SEAL]

Attest:

RUTH C. MASON
Attesting Officer

LUTRELLE F. PARKER
Acting Commissioner of Patents and Trademarks